United States Patent
Dorfschmid et al.

[11] Patent Number: 6,015,031
[45] Date of Patent: Jan. 18, 2000

[54] ACTUATING DRIVE WITH VALVE UNITS FOR ACTUATING A FRICTION CLUTCH AND AN AUTOMATED SHIFT TRANSMISSION

[75] Inventors: Jens Dorfschmid, Notzingen; Thomas John, Sulzheim; Robert Seufert, Oerlenbach, all of Germany

[73] Assignee: Mannesmann Sachs AG, Schweinfurt, Germany

[21] Appl. No.: 09/078,114

[22] Filed: May 13, 1998

[30] Foreign Application Priority Data

May 15, 1997 [DE] Germany ............................ 197 20 302
Oct. 10, 1997 [DE] Germany ............................ 197 44 758
Apr. 8, 1998 [DE] Germany ............................ 198 15 666

[51] Int. Cl.$^7$ .................................................. B06K 41/22
[52] U.S. Cl. ................... 192/3.58; 192/3.61; 192/85 R; 192/103 F
[58] Field of Search ................... 192/3.58, 3.61, 192/3.63, 85 R, 103 F, 103 C; 74/336 R; 477/80

[56] References Cited

U.S. PATENT DOCUMENTS

| | | |
|---|---|---|
| 3,752,284 | 8/1973 | Brittain et al. ........................ 192/103 F |
| 3,942,393 | 3/1976 | Forster et al. ........................ 192/103 C |
| 4,172,505 | 10/1979 | Rabus et al. ...................... 192/103 C X |
| 4,343,387 | 8/1982 | Hofbauer ............................ 192/3.58 X |

FOREIGN PATENT DOCUMENTS

| | | |
|---|---|---|
| 38 36 145 | 4/1990 | Germany . |
| 42 37 853 | 5/1994 | Germany . |
| 43 09 901 | 9/1994 | Germany . |
| 44 33 824 | 3/1996 | Germany . |
| WO 96/23671 | 8/1996 | WIPO . |

Primary Examiner—Richard M. Lorence
Attorney, Agent, or Firm—Cohen, Pontani, Lieberman & Pavane

[57] ABSTRACT

An actuating drive for actuating a friction clutch and an automated shift transmission, having valve units which enable a switching operation, on the one hand, of the friction clutch, and on the other hand, of the shift transmission. It is possible for a change to the switching state at the friction clutch to be triggered by a gear selection device. The valve unit that is assigned to the friction clutch is assigned a switching device which has a link between the actuating cylinder for the slot selection and the hydraulic circuit that is connected to the actuating cylinder for actuating the friction clutch and enables the driving, as required, of one or the other actuating cylinder.

14 Claims, 3 Drawing Sheets

ACTUATING DRIVE WITH VALVE UNITS FOR ACTUATING A FRICTION CLUTCH AND AN AUTOMATED SHIFT TRANSMISSION

BACKGROUND OF THE INVENTION

1. Field of the Invention

The invention relates to an actuating drive for automatically actuating a friction clutch.

2. Description of the Prior Art

German reference DE 43 09 901 A1 discloses a hydraulic actuating drive by means of which a friction clutch and a shift transmission may be actuated in an automated manner. For automated clutch actuation, a transmitter cylinder which is operationally connected to a receiver cylinder has pressure applied to it. The receiver cylinder, for its part, is operationally connected to the clutch release of the friction clutch. By means of applying pressure to the transmitter cylinder, the actuating movement of the latter being detected by means of a sensor, the friction clutch may be actuated in an automated manner. The pressure necessary for the actuation of the transmitter cylinder is provided by a pressure reservoir or store, it being possible to regulate the connection between transmitter cylinder and pressure store by means of a valve unit. The valve unit provided has pulsed switching valves or a proportional directional valve.

Assigned to the pressure store are at least two further valve units, via which pressure may be applied to two actuating cylinders for automated actuation of the shift transmission. The valve units provided are proportional directional valves, pressure-regulating valves or pulsed switching valves. The actuating movement of these actuating cylinders is in each case detected directly or indirectly by means of sensors. For the purpose of actuation in the gear selection direction, a double-acting cylinder is provided. For the remaining actuating cylinders, it is also possible for single-acting cylinders to be provided. For the purpose of controlling the automated friction clutch and for the automated actuation of the shift transmission, the hydraulic actuating drive is assigned a control device to which the signals from the sensors assigned to the actuating cylinder and further signals characterizing the operating state of the vehicle are fed.

WO 96/23 671 discloses an arrangement by means of which a clutch and a transmission may be actuated automatically. The arrangement comprises a main valve by means of which, for automatic actuation of the clutch or for automatic actuation of the transmission, the application of pressure to an actuating unit in each case assigned to the clutches or to the transmission may be enabled.

SUMMARY OF THE INVENTION

The object of the present invention is to provide an actuating drive for actuating at least one friction clutch and, if appropriate, a transmission in such a way that the interruption of pulling force which occurs during a shift operation is minimized.

Furthermore, the invention is based on the objective of providing a system for detecting an engaged or almost engaged gear.

The control unit is assigned a sensor system for picking up signals characterizing the gradient of the transmission input shaft speed. The sensor system has a signal connection to the control unit, so that the control unit can be fed these signals. During the engagement of a desired gear, the transmission input shaft is accelerated or decelerated in accordance with the transmission ratio of the desired gear, which is reflected in the gradient of the transmission input shaft speed. Once the gear is almost engaged, then the gradient tends toward zero. Depending on this gradient of the transmission input shaft speed, the control unit controls the actuator for the purpose of engaging the friction clutch, in the case of a friction clutch that is at least partly disengaged, starting from this position. It is advantageous that an almost engaged gear is detected in good time, and thus the engagement of the friction clutch can already be initiated before a fully engaged gear is achieved. As a result, the time duration of a disengaged friction clutch during a gear change can be shortened, which has an advantageous effect on the driving dynamics.

It has proven to be advantageous to detect synchronization points that are assigned to the individual gears by using the gradient of the transmission input shaft speed. These synchronization points may be compared with synchronization points that are assigned to the gears and stored in the control unit. As a result, a change in the synchronization points in the course of the service life of the motor vehicle can be detected, and the synchronization points stored in the control unit can be modified accordingly.

It has proven to be advantageous, depending on the gradient of the transmission input shaft speed, to detect the instantaneous actuation position of the transmission in relation to the synchronization point in the case of a lengthy shift operation.

It has proven to be advantageous, in the case of a design having a gear selection device, to drive the gear selection device as a function of the gradient of the transmission input shaft speed. It is possible for the gear selection device to be driven in such a way that the gradient of the transmission input shaft speed has a predetermined profile of a characteristic curve. As a result, the actuation of the transmission and of the clutch can be carried out in a manner matched optimally to each other. Provision may be made to drive the gear selection device as a function of the driving style of the driver. In the case of a sporty driver, a brisk gear engagement is controlled by means of the gear selection device, and in the case of an average driver, the desired gear is engaged by means of the gear selection device in a manner that takes care of the transmission.

In a further embodiment the clutch is partly initially engaged as early as during the driving of the transmission gear selection device, and the clutch is fully engaged when the gradient of the transmission input shaft speed falls below a predetermined limit value, which preferably indicates an almost engaged gear. Advantageously, in the case of a partly engaged friction clutch, no torque or only a minimum torque is transmitted via the friction clutch. This optimal adaptation allows the time needed for a shift operation to be shortened. Even in the case of a manual transmission actuation, the position in which the desired gear is almost engaged can be detected in good time, and the engagement of the clutch can be initiated in good time, before the gear is fully engaged.

In another embodiment, an actuating drive is provided which comprises valve units which enable a shift operation, on the one hand, on the friction clutch, and on the other hand, on the shift transmission.

This actuating drive comprises a switching device which is assigned to the valve unit assigned to the friction clutch if the actuating cylinder for the slot selection is connected to the hydraulic circuit assigned to the friction clutch. By means of the switching position of the switching device, it is possible to switch the application of pressure by means of the pressure that can be provided by the valve unit between the actuating cylinder for actuating the friction clutch and the actuating cylinder for the slot selection. Since the simultaneous actuation of slot selection and friction clutch is not necessary during the gear change, it is possible for these two actuating cylinders to be driven via a common hydraulic circuit. It is therefore possible to dispense with a control valve.

In still a further embodiment the valve unit is a proportional directional valve. By means of indirect or direct detection of the actuating movement initiated by the actuating cylinder, it is possible for the respectively automated actuation to be regulated exactly. The valve unit is driven appropriately by the control device in order to provide the necessary pressure.

When the gear selection device is activated in the direction of the gear to be engaged, it has proven to be advantageous to switch the switching device in such a way that the driving of the actuating cylinder that is assigned to the friction clutch is enabled. As a result, the friction clutch can be engaged without time delay, as soon as the gear is at least almost engaged.

It is advantageous to drive the actuating cylinder for changing the switching state of the friction clutch in the clutch engagement direction as a function of the gradient of the transmission input shaft speed when a gear is being engaged. In this case, the gradient of the transmission input shaft speed results from the synchronization work which is exerted by the gear selection device on the synchronization device of the transmission during the engagement of the gear. Up to the synchronization point, a long actuating stroke is covered, with low required force, in order to engage a gear. The gradient of the transmission input shaft speed is low. The gradient of the transmission input shaft speed on account of friction losses, for example in the shaft bearing, is negligible in comparison with the gradient occurring during the synchronization. At the synchronization point, the required force for the synchronization work is provided by the gear selection device. The stroke to be covered in this process is short, and the gradient which occurs is considerable. The gradient decreases with increasing synchronization. As a result, it is possible to detect a gear that is engaged or almost engaged.

A further embodiment provides engagement of the friction clutch as soon as the gradient falls below a predetermined limit value. This limit value corresponds to an almost engaged gear. Furthermore, it has proven to be advantageous to take into account the actuating stroke covered by means of the gear selection device. Provision may be made, after the gear selection device has exceeded a minimum actuating stroke, to drive the actuating cylinder for the automated actuation of the friction clutch, at least for the partial engagement of the latter.

When the friction clutch is disengaged for a gear change, it is advantageous to switch over the switching device for changing the slot in order to drive the appropriate actuating cylinder. If a slot change is not required in the case of the desired gear change, for example from the first to the second gear, then switching the switching device is not necessary.

It has proven to be advantageous for the control valves provided to be two identically constructed, preferably proportional, directional valves. In this way, the multiplicity of types of the components required during the production of the actuating drive is reduced. It is thus possible for relatively large numbers to be purchased, which means a price advantage may be achieved. In addition, the stockholding of the components which may be needed for repair is reduced, which has an advantageous effect on workshop and repair costs.

The actuating device has a reservoir comprising an inner chamber and a boundary. It is advantageous to provide the boundary with at least one cut-out for the accommodation of a valve unit in each case. The valve units are arranged in such a way that, in at least one switching position, a direct hydraulic connection to the inner chamber of the reservoir is produced. This prevents any influence on the returns from the various valve units, since the hydraulic medium of the return, after passing through the valve unit, has already arrived in the inner chamber of the reservoir. Influencing the returns from the actuating cylinders via the valve units could be eliminated by means of larger diameters of the hydraulic lines to the reservoir, but this would be associated with greater costs. In the case of this arrangement, the hydraulic connections from valve units to the reservoir are even dispensed with.

Furthermore, in another embodiment of the invention the switching device has a control device assigned to it which drives the switching device at least as a function of the control of the valve units. Depending on the control of the valve units, the actuating cylinders that are connected hydraulically to the valve units may have pressure applied to them. Depending on the switching position of the switching device, the actuating cylinder which is provided for the actuation of the friction clutch or for the slot selection can be connected hydraulically to the valve unit that is assigned to the friction clutch, so that the switching device is driven indirectly as a function of the driving and the actuation of the actuating cylinder. In specific operating situations, it is necessary to ensure that the pressures applied to the switching device in the hydraulic lines that are connected to one another with the switching of the switching device do not exceed a predetermined pressure difference or pressure drop. With the switching of the switching device, a pressure equalization takes place, as a result of which an actuating movement of the actuating cylinder that is connected via the switching device to the associated valve unit is established. By prescribing the maximum pressure difference which can be established by means of appropriate driving of the valve unit assigned to the switching device, any undesired actuating movement associated with switching the switching device is wholly or virtually interrupted because of the pressure equalization.

In a further embodiment of the invention, a nonvolatile memory, in which adaptation data are stored, is assigned to the control device. These adaptation data may be read by means of an adaptation routine. As a result, the production fluctuations, in particular of valve units, in the switching device, the friction clutch and the transmission may be compensated for. Provision is made to run through the adaptation routine in predetermined operating situations, so that the adaptation data can also be modified during the duration of operation of the motor vehicle. In this way, any dynamic, age-induced alteration to the actuating drive is compensated for. This makes it possible to ensure that the actual position does not deviate from a predefined desired position by more than a predetermined amount. In order to register the actual position, sensors are assigned to the actuating cylinders.

In yet a further embodiment hydraulic lines are provided with blocking devices between the hydraulic chambers of actuating cylinders of the actuating drives. The hydraulic lines are always closed when pressure is applied to them at the working pressure that is provided during normal operation by the pressure store. The blocking devices provided may, in particular, be non-return valves and, in order to vent the hydraulic system, these blocking devices may be released by applying a pressure that exceeds the normal operating pressure. It is also possible for the releasing of the individual blocking devices one after another to be provided in a manner coupled with predefined actuations of the valve units and of the switching devices, so that the possible hydraulic circuits are flushed through with hydraulic fluid one after another in stages. During the flushing, any air present in the respective hydraulic circuit is entrained by the hydraulic fluid flowing through and is flushed out. In addition, it is also possible for blocking devices which can be switched by a control system and are released by the control system in order to vent the system to be provided.

It has proven to be advantageous to limit the actuating force that can be introduced into the transmission for automated actuation of the transmission. Advantageously, the actuating cylinders are provided with blocking devices so that, as a result, any excessive application of pressure to one of the hydraulic chambers of the actuating cylinders of the hydraulic system, in particular of the actuating cylinders of the gear selection device, as a result of releasing the blocking device is prevented. Excessive loading of the transmission, in particular of the synchronization devices, is prevented in this way.

In the case of a friction clutch that can be actuated in an automated manner by means of an actuator, it is advantageous for the engagement of the friction clutch, starting from an at least partly disengaged position, to drive the actuator as a function of the gradient of the transmission input shaft speed. The actuator that can be used is, for example, the actuator disclosed by DE 44 33 824 A1 or from DE 42 37 853 A1.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
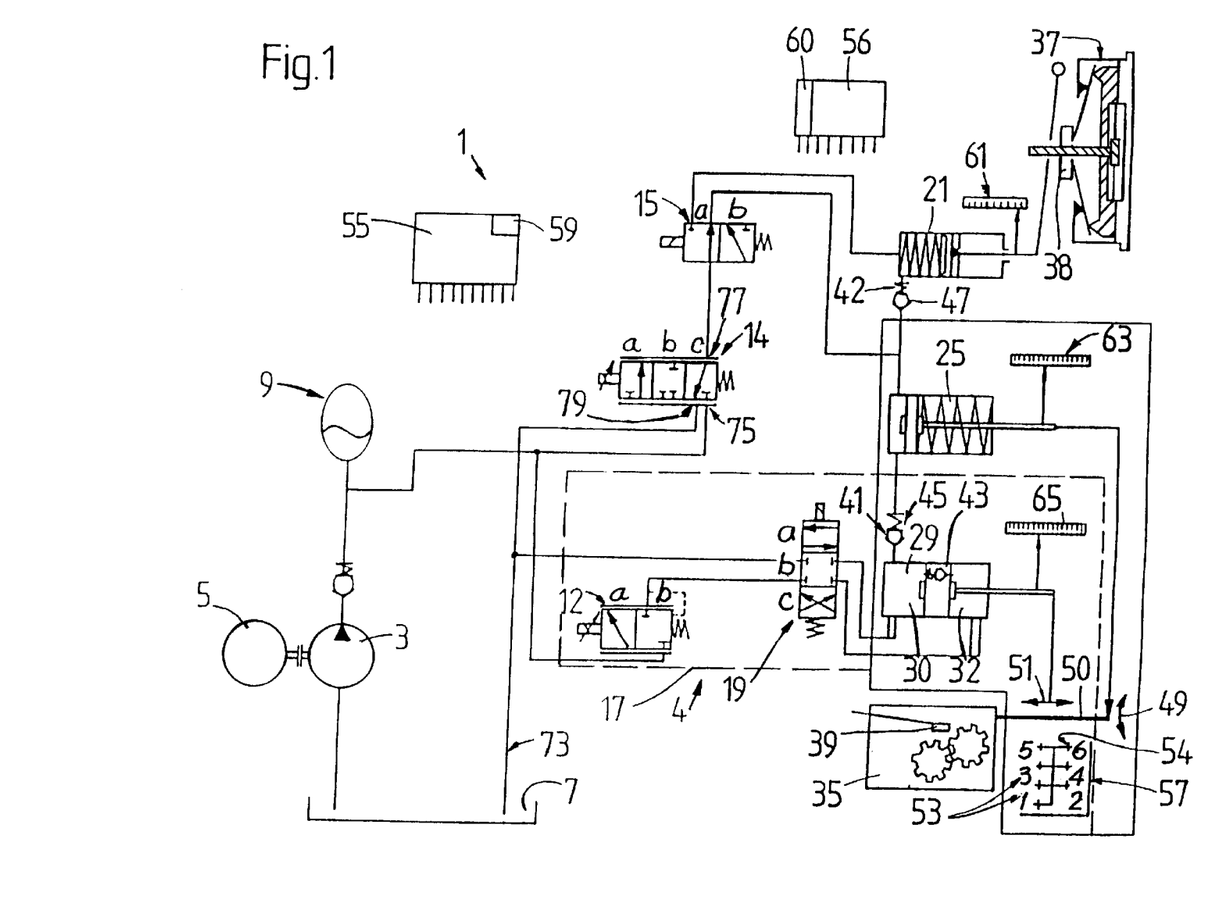
FIG. 1 shows an actuating drive with hydraulic actuating cylinders for the automated actuation of a friction clutch and of a shift transmission.

The hydraulic system 4 illustrated in FIG. 1 comprises a plurality of hydraulic cylinders 21, 25, 29 for the automated actuation of a friction clutch 37 and a transmission 35. Two of the hydraulic cylinders 21, 25 are single-acting cylinders for actuating the friction clutch 37 and for actuating the transmission 35 in the slot selection direction 49. Another of the hydraulic cylinders 29 is provided in the gear selection direction 51 as a double-acting cylinder. In order to drive the hydraulic cylinders 21, 25, 29, a pressure store 9 is provided to which, by means of a pump 3, hydraulic fluid may be applied from a reservoir 7. The pump is driven by a drive 5, preferably an electric motor. The hydraulic cylinders 21, 25, 29 can be connected hydraulically to the pressure store 9 via valve units, and via a downstream switch in valve 19 having switching positions a,b,c, or a switching device 15 having the switching positions a and b, as a result of appropriate switching. The valve units provided here are control valves in the form of a pressure-regulating valve 12 and a proportional directional valve 14.

The hydraulic cylinders 21, 25, 29, with the valve units, the switching valve 19 and the switching device 15, constitute the hydraulic system 4. It is possible for a filter, by means of which any dirt particles present may be filtered out, to be arranged in the hydraulic system 4. The functioning of the valve unit can be impaired by dirt particles in the hydraulic fluid. Dirt particles may get into the hydraulic medium, for example as a result of wear, in particular abrasion.

The structure of the hydraulic system 4 will be discussed in more detail in the following. Hydraulically connected to the pressure store 9 is the pressure-regulating valve 12, via which pressure can be applied to the switching valve 19. Depending on the switching position of the switching valve 19, pressure may be applied to one of the hydraulic chambers 30, 32 of the hydraulic cylinder 29, which is constructed as a double-acting cylinder 29. This double-acting cylinder 31 is operatively connected to the selector shaft 50. As a result of the deflection of the double-acting cylinder 29, the selector shaft 50 of the transmission 35 is actuated in the gear selection direction 51. Assigned to this double-acting cylinder 29 is a sensor 65, which picks up the actuating movement of the cylinder 29. This hydraulic circuit, comprising the pressure-regulating valve 12, the control valve 19 and the double-acting cylinder 29, forms the gear selection device 17. Furthermore, the transmission 35 is assigned a sensor 57 for the detection of the switching position of the transmission 35 or of the selector shaft 50. The sensor 57 provided may be, for example, the sensor disclosed by DE 38 36 145 A1, which may be arranged inside or outside the transmission 35.

Connected to the pressure store 9 is a further valve unit in the form of a proportional directional valve 14. Connected downstream of the proportional directional valve 14 is the switching device 15. The switching device 15 provided here is a 3/2-way valve. Depending on the switching position of the switching device 15, either the actuating cylinder 21 for actuating the friction clutch 37 or the actuating cylinder 25 for actuating the selector shaft 50 in the slot selection direction 49 may have pressure applied to it or may be switched to zero pressure via the proportional directional valve 14. These single-acting cylinders 21, 25 are each assigned a sensor 61, 63 for the detection of the respective actuating movement. The output part of the actuating cylinder 21 for actuating the friction clutch 37 acts here via a lever on a clutch release 38 of the friction clutch 37. The output part of the actuating cylinder 25 for actuating the shift transmission 35 in the slot selection direction 49 is operationally connected to the selector shaft 50.

Furthermore, a sensor 39 for the detection of the gradient of the transmission input shaft speed is assigned to the transmission 35. The sensors that can be used are, for example, Hall elements or magnetic elements or incremental transmitters.

Furthermore, this hydraulic system is provided with a venting system 41, whose structure will be described in more detail in the following.

As a result of the switching of the valve units 12, 14 the switching device 15 and the switching valve 19, pressure may be applied to hydraulic chambers of the actuating cylinders 21, 25, 29. These hydraulic chambers of the actuating cylinders 21, 25, 29 are connected to one another via hydraulic connections that are provided with blocking devices 42. In the exemplary embodiment illustrated, the blocking devices 42 provided are non-return valves 43, 45, 47, which block the respective hydraulic connection in the case of an applied pressure that is in the range of the normal working pressure. By means of these hydraulic connections, the venting system 41 is integrated in the actuating drive 1, the functioning of which will be discussed in detail later.

Firstly, the functioning of the actuating drive 1 illustrated in FIG. 1 is to be discussed in more detail.

If a desired or required gear change is detected, then in the case of a transmission whose actuating cylinder 25 for slot actuation is switched to zero pressure when the gear 53 is engaged, preferably by enabling a hydraulic connection of a return 73 via the valve 14 in the switching position c, given switching position a in the switching device 15, the actuating cylinder 25 for slot actuation is driven first. The switching device 15 is driven by the control device 55 to assume the switching position a, if this is not the current switching position. In order to apply pressure, the proportional directional valve 14 is switched into switching position a, so that the selector shaft 50 in the appropriate selector slot of the engaged gear assumes a selection-free position, preferably the central position, from a selection position. The application of pressure required for this is controlled by a control system 56 by feeding back the actuating movement detected by the sensor 63. Assigned to this control system 56 is a nonvolatile data memory 60, in which control data are stored. Once the desired position has been assumed, the proportional directional valve 14 is switched to switching position b. If provision is made for the selector shaft 50 to remain in a central position in the slot of the engaged gear when the gear 53 is engaged, then a desired gear change is begun with the following step. The control devices 55, 56 initiate declutching and changing into neutral. The switching device 15 is switched over into switching position b. The flow of hydraulic fluid to and from the actuating cylinder 25 is thus blocked, and a hydraulic connection from the proportional directional valve 14 to the actuating cylinder 21 is enabled. The proportional directional valve 14 is switched over again into switching position a, as a result of which the actuating cylinder 21 has pressure applied to it. For rapid disengagement, the actuating cylinder 21 has maximum pressure applied to it. The actuating movement is detected by means of the sensor 61 and, by means of driving the proportional directional valve 14, recourse also being made to appropriate data from the data memory 60, the friction clutch 37 is positioned in an actuating position in which preferably precisely no torque is transmitted via the friction clutch 37. During or after the disengagement of the friction clutch 37, the shifting of the gear into neutral is provided. The switching valve 19 is switched over, as a result of which the actuating direction is reversed. With recourse to stored data, which are preferably stored in the data memory 60, the pressure-regulating valve 12 is switched to the switching position a so that the actuating cylinder 29 executes the desired actuating movement to shift the gear into neutral.

The data memory 60 preferably comprises a characteristic map, in which appropriate desired actuating characteristic curves assigned to the gear change are stored. These desired actuating characteristic curves can be converted into drive profiles by extracting adaptation data. It is also possible for drive profiles to be stored directly, these profiles being adapted specifically to the respective actuating drive by means of the adaptation data stored in the nonvolatile memory 59. If a slot change is required, then the switching device 15 is switched over into position a. Depending on the required actuating direction of the actuating cylinder 25, the proportional directional valve 14 is switched into switching position a or c. Following detection of the predefined desired position with respect to the slot, by means of the sensor 63, the proportional directional valve 14 is switched again into switching position b. The slot that is allocated to the desired gear is assumed, and the gear 53 may be engaged. For this purpose, the switching valve 19 is switched over into switching position a or c, depending on the required actuating direction of the actuating cylinder 29, in order to engage the desired gear. It is then possible to make provision for a rapid actuating movement of the actuating cylinder 29 at first, by means of appropriate driving of the pressure-regulating valve 12 into switching position a. Shortly before reaching the synchronization point 54, the application of pressure is reduced, with the result that the synchronization point 54 is approached at a reduced actuating speed. When the synchronization point 54 is reached, the force required for the synchronization is provided in a controlled manner by means of appropriate application of pressure. During the synchronization, the transmission input shaft is accelerated or decelerated to the speed of the transmission output shaft. Hence, a large gradient of the transmission input shaft speed occurs. This gradient is detected by the sensor 39. The synchronization operation can be controlled in a deliberate way as a function of the gradient of the transmission input shaft speed. The stroke covered during the synchronization operation is very low. An engaged gear may be detected, on the one hand, by the establishment of a notable actuating movement of the actuating cylinder 29 by the sensor 65 and/or by a minimum gradient of the transmission input shaft speed, which results from the friction losses of the vehicle at the corresponding speed on account of the interruption of the pulling force. In this embodiment, provision is additionally made of a further sensor 57, which is assigned to the transmission and by means of which the respective position of the selector shaft or of the switching position of the transmission is registered. If an engaged or almost engaged gear is detected by the control device 56, then the friction clutch 37 may be engaged again. The position of the almost engaged gear corresponds to a position in which the position 1–5 allocated to the gear 53, and reverse gear, of the fully engaged gear is assumed during the driving of the friction clutch 37. In order to engage the clutch, the switching device 15 is switched into switching position b. In order to apply pressure, the proportional directional valve 14 is switched over into switching position a. In specific cases, equalization of the pressure that is applied to the pressure store side to the pressure on the cylinder side of the cylinder to be driven may be required. If this is required, then the switching device provided is a 3/3-way valve which, in one of its switching positions, preferably the central switching position, blocks the hydraulic connections to the two actuating cylinders 21, 25. The proportional directional valve 14 is briefly switched into switching position a or c in order to build up the desired pressure in the hydraulic feed line of the switching device on the side facing away in the cylinder. The proportional directional valve 14 is then switched over into switching position c in order to relieve the pressure on the actuating cylinder 21. This actuating cylinder 21 is relieved of pressure in a controlled manner, so that the friction clutch 37 is engaged without a jolt. Provision may be made to engage the friction clutch so that the gradient of the transmission input shaft speed has a predefined profile or does not exceed a maximum predefined value. If the control device 56 has available signals characterizing the drive, here the internal combustion engine, such as the engine torque and/or rotational speed, then it is possible for these data to be used to prescribe a specific gradient profile of the transmission input shaft. In support of this, it is also possible to provide for driving the engine in order to equalize the speed of crankshaft and transmission input shaft. In the embodiments illustrated, the control device 55 for controlling the switching device 15 and the control device 59 of the actuating drive 1 are illustrated separately, but it is readily possible to provide a central control device. Once the friction clutch 37 is fully engaged, it being possible for this state to be detected by an identical gradient of the crankshaft and the transmission input shaft, the proportional directional valve 14 is switched over into switching position b. The gear change is completed. If provision is made to switch the actuating cylinder 25 for actuating the slot to zero pressure when the gear 53 is engaged, then upon detecting the engaged gear 53, the actuating cylinder 25 is switched to zero pressure by switching the switching device 15 into switching position a and switching the proportional directional valve 14 into switching position c. This relieving of pressure on the actuating cylinder 25 is optional and is envisaged after the engagement of the friction clutch 37.

The functioning of the venting system 41 is described in more detail in the following. After the fitting of the actuating drive 1, or after repair work on the hydraulic system 4 of the actuating drive 1, venting may be required in order to ensure fault-free functioning. In the case of the embodiment illustrated, step-wise flushing of the hydraulic chambers of the actuating cylinders 21, 25, 29 may be controlled. One possible switching sequence is described in the following. Flushing the hydraulic chambers in a differing sequence may be provided without altering the venting system 41 as such. The valve 12 is switched into switching position a, and the downstream switching valve 19 is likewise brought into switching position a. A pressure that considerably exceeds the normal working pressure is provided. The pressure-limiting valve 43 is opened by this pressure and at least the two hydraulic chambers 30, 32 of the actuating cylinder 29 are flushed with hydraulic fluid. Once these hydraulic chambers 30, 32 have been flushed sufficiently, the switching valve 19 is switched over into switching position c. In addition, the switching device 15 is switched to switching position a and the valve 14 is switched to switching position c. As a result, the hydraulic chamber 30 of the actuating cylinder 29 and, as a result of releasing the pressure-limiting valve 45, the hydraulic chamber of the actuating cylinder 25 are flushed with hydraulic fluid. By switching the switching device 15 into switching position b, and releasing the non-return valve 47, the hydraulic chamber of the actuating cylinder 21 is flushed with hydraulic fluid. When a pressure within the range of the working pressure is applied, the non-return valves close again and the venting operation is completed. The actuating drive 1 is operationally ready.

Figure 2:
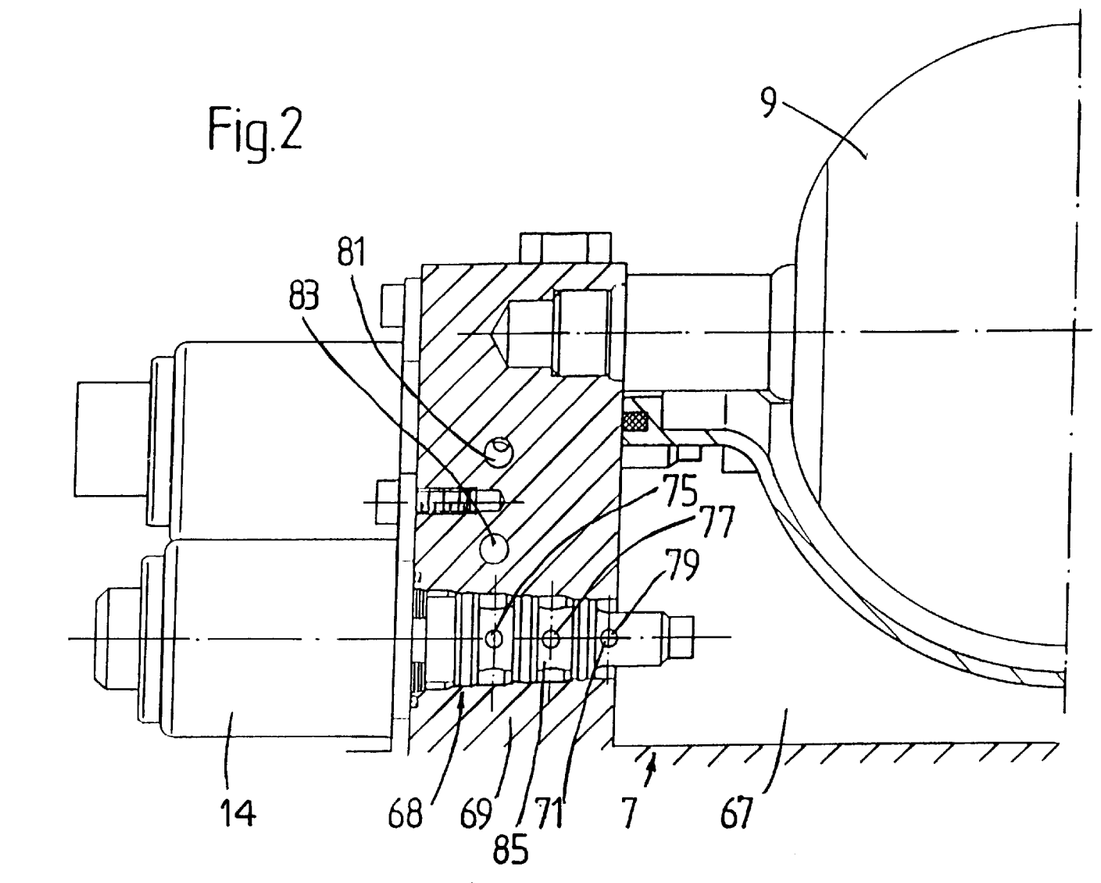
FIG. 2 shows a reservoir with valve unit.

One possible linking of the valve unit 10 to the reservoir is described in more detail using FIG. 2. The reservoir 7 has an inner chamber 67 and a boundary 69. The boundary 69 is provided with a cut-out 68, which reaches into the inner chamber 67. The valve unit 10 completely fills the cut-out 68 on the outside of the boundary 69, which ensures the hydraulic tightness of the boundary 69. The valve unit 10 has a pressure-store connection 75, an output connection 77 and a reservoir connection 79, the last-named projecting into the inner chamber 67 of the reservoir 7, so that the hydraulic medium passing the reservoir connection 79 passes directly 71 into the inner chamber 67 of the reservoir 7. The boundary is provided with drillings 81, 83. Via the drilling 81, a hydraulic connection can be provided from the output connection 77 to at least one of the actuating cylinders 21, 25, 29. Via the drilling 83, a hydraulic connection can be provided from the pressure-store connection 75 to the pressure store 9. The valve 14 illustrated comprises an outer sleeve 85 which is arranged fixedly in relation to the boundary 69, the hydraulic connections that are provided by means of the valve 14 being able to be switched by means of at least one inner element that can be displaced in relation to the outer sleeve.

Figure 3:
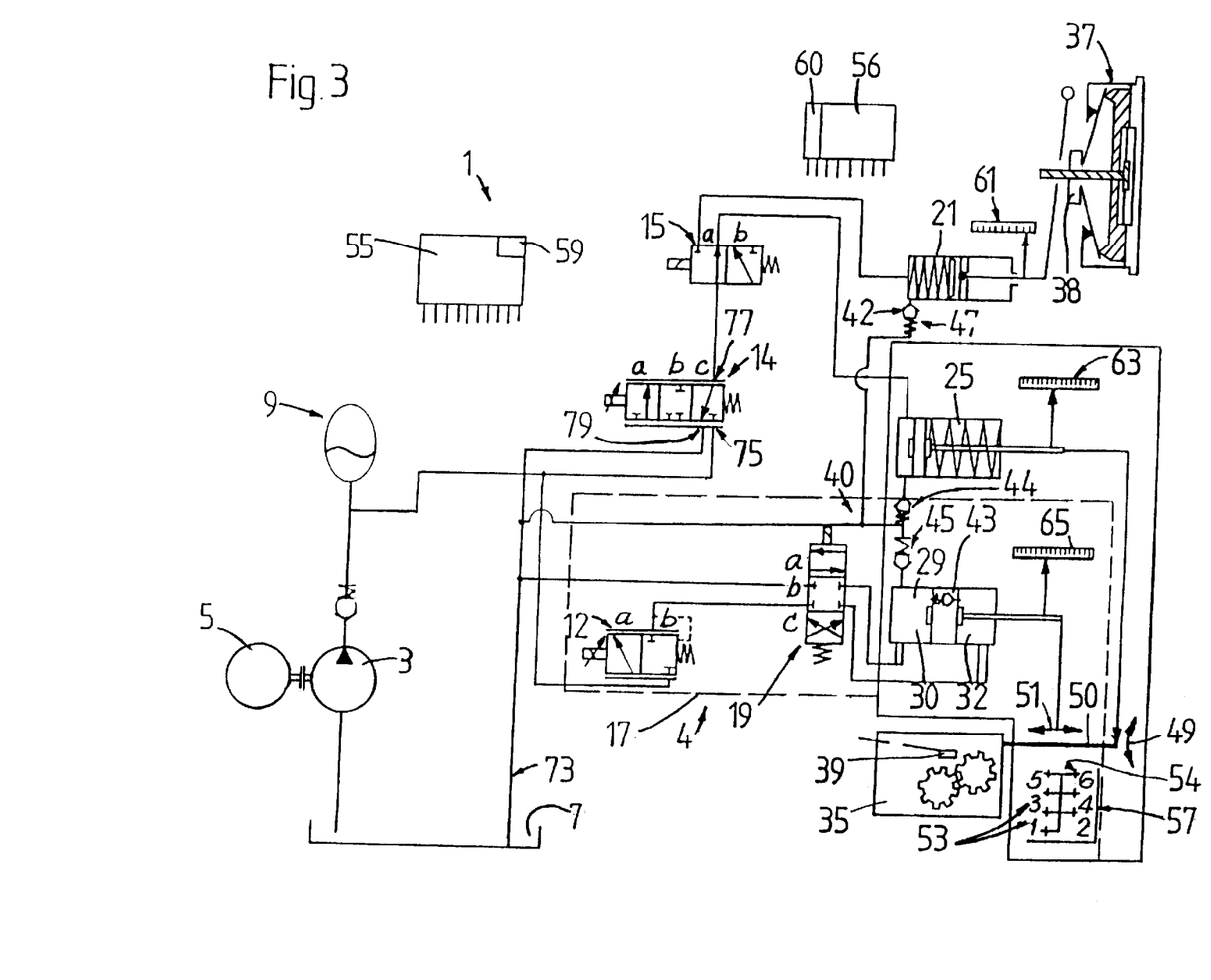
FIG. 3 shows an actuating drive with hydraulic cylinders for the automated actuation of a friction clutch and of a shift transmission.

The exemplary embodiment illustrated in FIG. 3 has a venting system 40 that differs from the venting system 41 described in FIG. 1. The remaining structure corresponds to the structure described in FIG. 1. The venting system 40 is described in more detail in the following. The venting system 40 shown comprises a non-return valve 47 that is assigned to the actuating cylinder 21 provided for the clutch actuation. In the event of applying a pressure that exceeds a predetermined limit value to the actuating cylinder 21, the non-return valve 47 opens and hydraulic fluid flows through the hydraulic line and the hydraulic chamber of the actuating cylinder 21 for the purpose of venting. The hydraulic fluid flows back into the reservoir 7 via the return 73. The actuating cylinders 25, 29 provided for the automated actuation of the shift transmission are also provided with non-return valves 43–45. In order to vent the system, the actuating cylinders 25, 29 have applied to them a high pressure at which the non-return valves 43–45 open. Hydraulic fluid flows through the hydraulic lines and the hydraulic chambers of the actuating cylinders 25, 29, any residual air being entrained by the hydraulic fluid flowing through.

Furthermore, as a result of the arrangement shown in FIG. 3 of the non-return valves 43–45, an excess introduction of force for the automated actuation of the transmission, or an excess application of pressure to the actuating cylinders 25, 29 is prevented. If high pressure is applied to the hydraulic chambers 32, the non-return valve 43 opens. The hydraulic fluid flows into the hydraulic chamber 30. As a result, the pressure difference between the hydraulic chambers 30 and 32, and the force introduced into the transmission, is reduced accordingly. If a predetermined pressure in the hydraulic chamber 30 is exceeded, the non-return valve 45 opens and the hydraulic fluid flows back into the reservoir via the return 73. If excess pressure is applied only to the hydraulic chamber 30, the non-return valve 43 opens and the hydraulic fluid flows back into the reservoir 7, as a result of which the introduction of force into the transmission by means of applying pressure to the chamber 30 is limited. The actuating cylinder 25 is also provided with a non-return valve 44. In the event of applying pressure having a pressure exceeding a predetermined limit value, the non-return valve 44 opens, as a result of which the force that can be introduced into the transmission by means of the actuating cylinder 25 is limited. The selection of the respective non-return valves makes it possible to predefine the maximum pressure which may be applied to the hydraulic chambers of the actuating cylinders 25, 29.

The invention is not limited by the embodiments described above which are presented as examples only but can be modified in various ways within the scope of protection defined by the appended patent claims.

We claim:

1. An actuating drive for automated actuation of a friction clutch, comprising:

actuator means for automated engagement and disengagement of the friction clutch;

control means, to which signals characterizing an operating state are fed, for controlling the actuator means for the engagement and disengagement of the friction clutch as a function of the signals;

a sensor system which picks up signals characterizing a gradient of a transmission input shaft speed, the control means receiving signals from the sensor system, whereby, starting from a position in which the friction clutch is at least partly disengaged by the actuator means, an engagement rate of the friction clutch by means of the actuator means is predeterminable as a function of the gradient of the transmission input shaft speed, individual gears of a transmission being assigned synchronization points which, when a respective gear is selected, are detectable via the gradient of the transmission input shaft speed that results from synchronization operation; and a gear selection device and actuating cylinder means for actuating a gear selection in the transmission, one of the gear selection device and the actuating cylinder means being driven in a gear selection direction as a function of the gradient of the transmission input shaft speed.

2. An actuating drive as defined in claim 1, wherein the control means is operative to actuate the actuator means to engage the friction clutch as soon as the gradient of the transmission input shaft speed falls below a predetermined limit value.

3. An actuating drive as defined in claim 1, wherein the control means is operative, as a function of the gradient of the transmission input shaft speed, to actuate the actuator means to partly engage the friction clutch when the gradient falls below a first limit value and to fully engage the friction clutch when the gradient falls below a second limit value.

4. An actuating device for automated actuation of a friction clutch, comprising:

actuator means for automated engagement and disengagement of the friction clutch;

control means, to which signals characterizing an operating state are fed, for controlling the actuator means for the engagement and disengagement of the friction clutch as a function of the signals; and a sensor system which picks up signals characterizing a gradient of a transmission input shaft speed, the control means receiving signals from the sensor system, whereby starting from a position in which the friction clutch is at least partly disengaged by the actuator means, an engagement rate of the friction clutch by means of the actuator means is predeterminable as a function of the gradient of the transmission input shaft speed, the actuating means including actuating cylinders, the sensor system including sensors arranged at the actuating cylinders for ascertaining the position of the actuating cylinders, the control means being operative to detect a deviation of an actual position from a desired position based on the signals from said sensors.

5. The actuating drive as defined in claim 4, wherein when the deviation between the actual position and the desired position exceeds a predetermined amount, the control means is operative to include the amount of the deviation of the actual position in relation to the desired position in a formation of up-to-date adaptation data.

6. An actuating device for automated actuation of a friction clutch, comprising:

actuator means for automated engagement and disengagement of the friction clutch;

control means, to which signals characterizing an operating state are fed, for controlling the actuator means for the engagement and disengagement of the friction clutch as a function of the signals; and a sensor system which picks up signals characterizing a gradient of a transmission input shaft speed, the control means receiving signals from the sensor system, whereby starting from a position in which the friction clutch is at least partly disengaged by the actuator means, an engagement rate of the friction clutch by means of the actuator means is predeterminable as a function of the gradient of the transmission input shaft speed, the actuator means for actuating the friction clutch includes a hydraulic circuit with an actuating cylinder to which further actuating cylinders are connected for automated actuation of a shift transmission, valve units being connected to the actuating cylinders so as to enable a switching operation between the friction clutch and the shift transmission, the valve unit assigned to the friction clutch having switching means, which is linked between one of the actuating cylinders for slot selection and a hydraulic circuit that is connected to another of the actuating cylinders, for actuating the friction clutch and selectively enabling driving of one of the actuating cylinders.

7. An actuating drive as defined in claim 6, wherein the actuating cylinder for the automated actuation of the transmission is drivable in a gear selection direction as a function of various travel parameters which characterize a mode of travel and as a function of which a gradient of the transmission input shaft speed is predefined, in order to achieve the gradient.

8. An actuating drive as defined in claim 6, and further comprising a gear selection device, the switching means being operative to be driven when the gear selection device is enabled, so as to enable driving of the actuating cylinder that actuates the friction clutch.

9. The actuating drive as defined in claim 7, and further comprising a gear selection device, the switching means being operative to be switched in a direction of the gear to be engaged in order to enable driving of the actuating cylinder that is assigned to the friction clutch.

10. An actuating drive as defined in claim 6, wherein the switching means is operative, when the friction clutch is disengaged, to switch over for a gear change involving a change of slot in order to drive an appropriate actuating cylinder.

11. An actuating drive as defined in claim 6, wherein the valve units include control valves, and at least two identically constructed proportional directional valves.

12. An actuating drive as defined in claim 11, wherein the control valves are two 3/3-way proportional directional valves.

13. An actuating drive as defined in claim 6, and further comprising a reservoir in fluid communication with the hydraulic circuit, the reservoir having an inner chamber and a boundary, the boundary of the reservoir having at least one cut-out that passes through the boundary so as to accommodate a respective one of the valve units, said respective unit including at least one reservoir connection via which a direction hydraulic connection to the inner chamber of the reservoir is formed.

14. An actuating drive as defined in claim 6, and further comprising blocking means assigned to the hydraulic cylinders for blocking the hydraulic connections between the chambers of the actuating cylinders during normal operation, the blocking means being released by a pressure that exceeds a normal operating pressure so that the hydraulic circuit is flushed with hydraulic fluid in order to vent the hydraulic system, entraining any residual air present, and so that the actuating force that is introducible into the hydraulic system for the automated actuation is limited.

* * * * *